United States Patent
Tsai et al.

(10) Patent No.: US 8,254,774 B2
(45) Date of Patent: Aug. 28, 2012

(54) AUTOFOCUS METHOD

(75) Inventors: Dong-Chen Tsai, Taipei (TW); Homer H. Chen, Taipei (TW)

(73) Assignee: National Taiwan University, Taipei (TW)

(*) Notice: Subject to any disclaimer, the term of this patent is extended or adjusted under 35 U.S.C. 154(b) by 162 days.

(21) Appl. No.: 12/780,490

(22) Filed: May 14, 2010

(65) Prior Publication Data
US 2011/0008032 A1 Jan. 13, 2011

(30) Foreign Application Priority Data
Jul. 7, 2009 (TW) .............................. 98122866 A

(51) Int. Cl.
*G03B 3/00* (2006.01)
*G03B 13/00* (2006.01)
(52) U.S. Cl. ........................................ 396/104; 348/351
(58) Field of Classification Search ............. 396/89, 396/104; 348/345, 349, 351, 353
See application file for complete search history.

(56) References Cited

U.S. PATENT DOCUMENTS

| | | | | |
|---|---|---|---|---|
| 6,885,819 | B2 * | 4/2005 | Shinohara | 396/127 |
| 6,989,865 | B1 * | 1/2006 | Ohta | 348/347 |
| 2006/0038017 | A1 * | 2/2006 | Carlson et al. | 235/462.24 |
| 2008/0124068 | A1 * | 5/2008 | Kwon et al. | 396/127 |
| 2008/0180563 | A1 * | 7/2008 | Hsu | 348/349 |
| 2010/0053417 | A1 * | 3/2010 | Baxansky | 348/345 |

* cited by examiner

*Primary Examiner* — Clayton E Laballe
*Assistant Examiner* — Warren Fenwick
(74) *Attorney, Agent, or Firm* — Peter F. Corless; Steven M. Jensen; Edwards Wildman Palmer LLP

(57) ABSTRACT

An autofocus method for obtaining clear images characterized by: adjusting the lens position with an initial dataset of focus values to obtain a estimated lens position; moving the lens to the estimated lens position and acquiring the corresponding focus value; determining whether the estimated lens position is sufficiently proximate to the prior estimated lens position, wherein, if it is, the autofocus process stops, and, if not, repeating the above-described steps until a lens position having an optimal focus value is obtained, thereby obtaining the clearest image with increased focusing speed and reduced time of lens movement and without the need of empirical parameters.

18 Claims, 6 Drawing Sheets

AUTOFOCUS METHOD

CROSS-REFERENCES TO RELATED APPLICATIONS

This application claims under 35 U.S.C. §119(a) the benefit of Taiwanese Application No. 98122866 filed Jul. 7, 2009 the entire contents of which is incorporated herein by reference.

BACKGROUND OF THE INVENTION

1. Field of the Invention

The present invention relates generally to autofocus camera, and more particularly, to an autofocus method that processes data of lens positions and focus values so as to obtain a lens position at which a sharp image can be captured.

2. Description of Related Art

In the autofocus process of a camera, the lens of the camera is moved from one position to another. At each lens position, the corresponding focus value is calculated. After each movement of the lens, a decision is made as to whether the maximum focus value is obtained.

FIG. 1A is a diagram illustrating the relationship between focus values and lens positions. The peak point H shown in FIG. 1A corresponds to the maximum focus value. FIG. 1B shows a conventional autofocus process. The autofocus process continues until the maximum focus value is found, at which a focused image can be captured. That is, if the ideal lens position is found, the autofocus process terminates; otherwise, the direction and distance of the subsequent movement of the lens are determined, and the steps of moving the lens and calculating the focus value are repeated.

Various algorithms, such as global search, binary search, and rules-based search algorithms, can be applied to search for the lens position that gives rise to maximum focus value.

The global search algorithm records the focus value at each lens movement and goes through all lens positions to exhaustively determine which lens position gives rise to the maximum focus value. Therefore, a reasonably complete plot close to that shown in FIG. 1A is obtained, and the peak point H can be accurately identified. However, the global search algorithm is time consuming.

To overcome the above-described drawback, a two-stage search algorithm has been developed, wherein the search process comprises a coarse search stage and a fine search stage. The coarse search is first performed according to the gradient of the focus values with respect to the lens position so as to estimate which range the peak point H may fall within. Subsequently, a fine search is performed by fitting a second-order quadratic or Gaussian curve to the focus values as a function of lens position within the range of the peak point described above.

Furthermore, US Patent Application No. 20080180563 discloses another autofocus method, wherein a search step look-up table is established in accordance with the total number of lens movements and the corresponding focus values. During the autofocus process, the direction and the distance of lens movements are determined in accordance with the search step look-up table.

Compared with the global search algorithm, the above-described techniques can increase the speed and reduce the number of lens movements. However, all these techniques require parameter adjustment and may not be efficient enough for practical applications. In addition, these techniques may not be able to provide sufficiently accurate results.

SUMMARY OF THE INVENTION

In view of the above drawbacks, the present invention provides an autofocus method that comprises the steps of: (1) obtaining an initial dataset of focus samples containing lens positions and focus values corresponding to the lens positions; (2) fitting the focus samples in the initial dataset to estimate the ideal lens position; (3) moving the lens to the estimated lens position to obtain a estimated focus value corresponding to the estimated lens position; and (4) determining whether the estimated lens position is proximate to the prior lens position thereof, wherein, if it is, the autofocus process stops, and, if not, fitting a plurality of the focus samples obtained in the previous steps to re-estimate the subsequent lens position, and returning to step (3).

The present invention provides an autofocus method for obtaining a lens position where a clear image can be captured. If the estimated lens position is proximate to the prior lens position thereof, this indicates that a clear image can be captured at the estimated lens position. Otherwise, the present invention fits the focus samples consisting of lens positions obtained antecedently and the corresponding focus values until a newly estimated lens position is proximate to the prior newly estimated lens position thereof, thereby obtaining the lens position with the maximum focus value that gives rise to the clearest image.

As mentioned above, the present invention estimates the optimal lens position using the data of focus values and lens positions, instead of adjusting parameters, to increase the focusing speed and reduce the number of lens movements.

DETAILED DESCRIPTION OF PREFERRED EMBODIMENTS

The following illustrative embodiments are provided to illustrate the disclosure of the present invention, these and other advantages and effects being apparent to those skilled in the art after reading the disclosure of this specification. The invention may, however, be embodied in many different forms and should not be construed as limited to the embodiments set forth herein. It should be noted that various modification and variation may be performed without departing from the scope of the present invention.

Figure 1A:
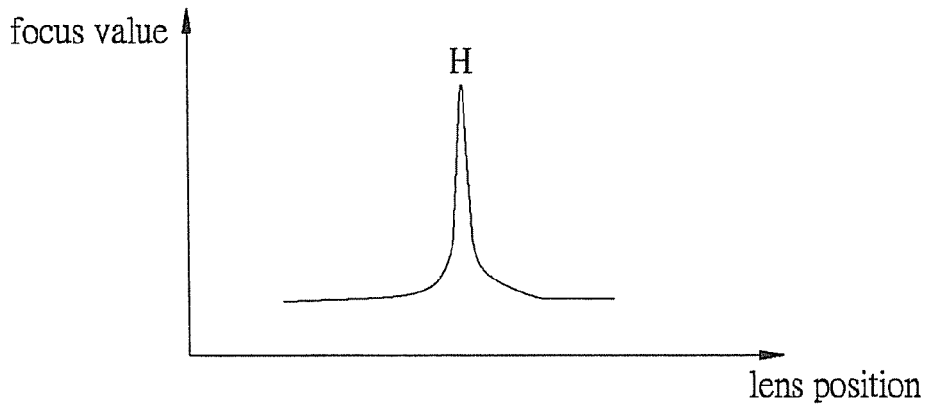
FIG. 1A is a plot illustrating the relationship between lens positions and focus values individually corresponding to the lens positions.
Figure 1B:
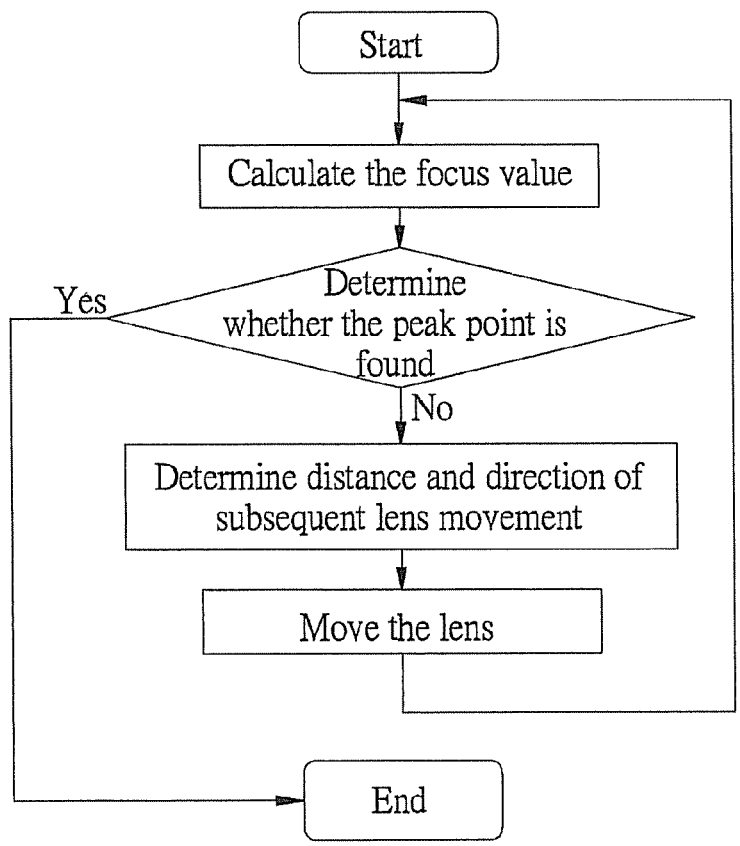
FIG. 1B is a flowchart illustrating a conventional autofocus method.
Figure 2:
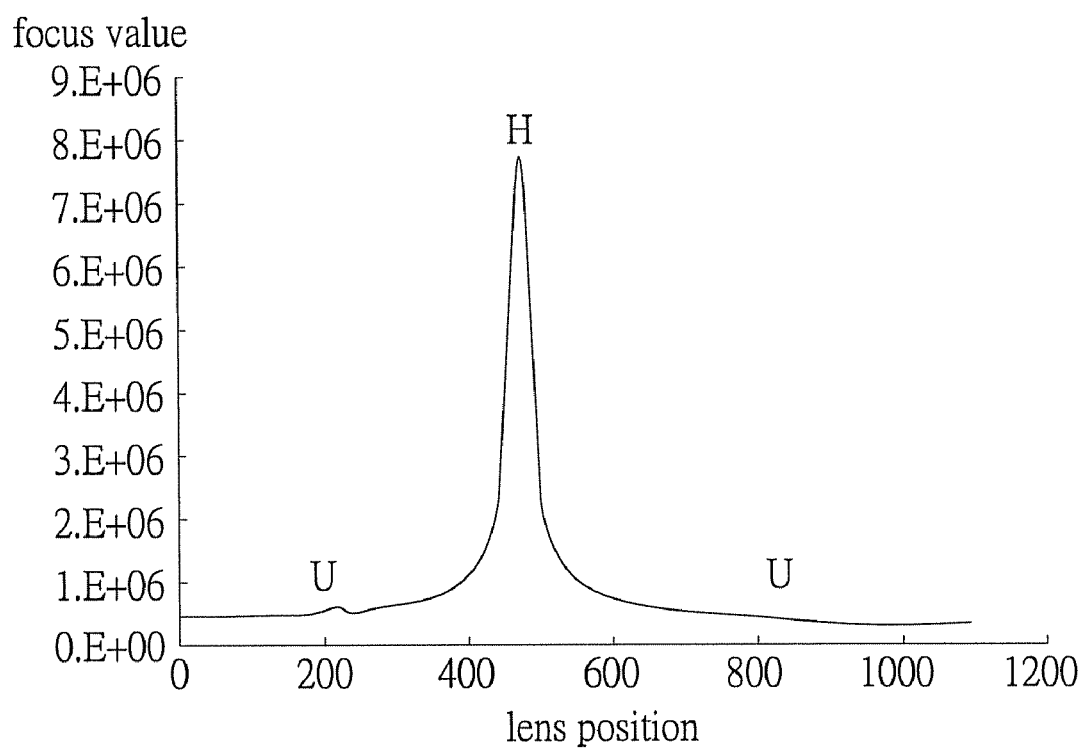
FIG. 2 is a plot illustrating the relationship between lens positions and focus values individually corresponding to the lens positions according to an autofocus method of the present invention.

FIG. 2 is a diagram illustrating the relationship between lens positions and focus values according to one embodiment of the present invention. An image can be captured at a lens position, and a focus value can be calculated according to the image, wherein the focus value represents the sharpness of the image. In the present embodiment, a bell-shaped curve can be drawn with all lens positions and focus values individually corresponding to the lens positions.

In the present embodiment, the present invention provides a full model $F=G(a,b,c,(x-m))$, wherein F represents a focus value, G represents a function, x represents a lens position, and a, b, c and m are parameters, wherein m represents the ideal lens position. The characteristics of the full model $F=G(a,b,c,(x-m))$ can be described through the parameters a, b, c and m. As shown in FIG. 2, H, denotes the peak point of the curve and U denotes the flat portion of the curve. The parameter 'a' controls the amplitude of the curve, i.e., the height of the peak point H, and the parameters 'b' and 'c' control the curvature from the peak point H to the flat portion U on both sides of the peak point H. In the present embodiment, only the parameters that are relative to the autofocus method of the present invention are provided in the model $F=G(a,b,c,(x-m))$. But it should be noted that the full model involving $F=G(a,b,c,(x-m))$ can have other parameters denoting other characteristics of the curve.

Further, the full model involving $F=G(a,b,c,(x-m))$ can be simplified into a simplified model $F=G(a,b,J,(x-m))$, wherein J is a fixed value. It should be noted that the full model can also be simplified into other models. Furthermore, in order to reduce the computational complexity, the simplified model $F=G(a,b,J,(x-m))$ is non-linearly transformed so as to obtain a function $Z(F)=Ax^2+Bx+C$ for estimating the ideal lens position, wherein Z represents a non-linear transformation. But it should be noted that the present invention is not limited thereto, for example, the $Z(\bullet)$ can be reciprocal transformation, $Z(F)=1/F$, wherein F is focus value(s).

Figure 3:
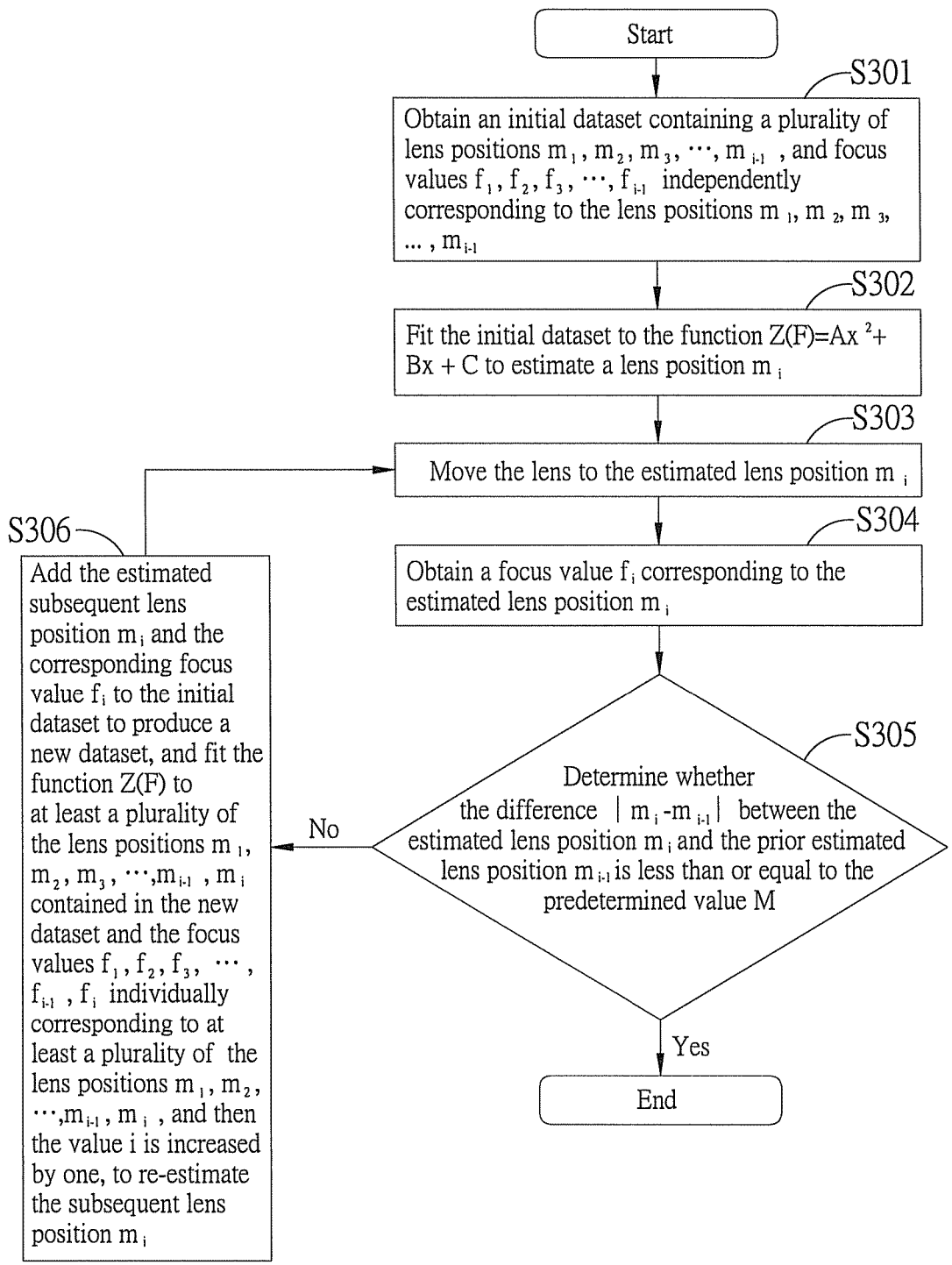
FIG. 3 is a flowchart showing an autofocus method according to an embodiment of the present invention.

FIG. 3 shows an autofocus method according to an embodiment of the present invention. In the present embodiment, the ideal lens position is estimated by fitting the function $Z(F)=Ax^2+Bx+C$ to an initial dataset of focus samples containing lens positions and focus values corresponding to the lens positions. The flowchart of FIG. 3A comprises a loop structure, wherein, if it is determined that the estimated lens position is not proximate to the prior estimated lens position, move the lens to the estimated lens position, and then add the estimated lens position $m_i$ and the corresponding focus value $f_i$ to the initial dataset to produce a new dataset, such that the function $Z(F)=Ax^2+Bx+C$ can be fitted to the focus samples in the new dataset, for estimating the subsequent lens position. Such iteration(s) will be performed until the estimated lens position is proximate to the prior estimated lens position. It should be noted that the mathematical symbols and loop structure in the drawing are not intended to limit the present invention.

As shown in FIG. 3, at step S301, an initial dataset of focus samples is obtained by moving the lens to different lens positions, wherein the initial dataset of focus samples contains a plurality of lens positions $m_1, m_2, m_3, \ldots, m_{i-1}$ and focus values $f_1, f_2, f_3, \ldots, f_{i-1}$ independently corresponding to the plurality of lens positions $m_1, m_2, m_3, \ldots, m_{i-1}$. As a specific embodiment, the lens is moved to three different lens positions $m_1, m_2,$ and $m_3$ so as to obtain the focus values $f_1, f_2,$ and $f_3$ corresponding to the lens positions, respectively. The three different lens positions $m_1, m_2,$ and $m_3$ and the corresponding focus values are denoted as the initial dataset of focus samples.

In one embodiment, the three different lens positions can be arbitrarily chosen along the axis of the lens. In another embodiment, the three different lens positions refer to an initial lens position and two lens positions that are forward and backward from the initial lens position, respectively, both being at the same distance from the initial lens position. In another embodiment, the first and second lens positions are arbitrarily chosen and the corresponding focus values are obtained, and the third lens position is determined according to the gradient of the focus values at the first and second lens positions. For example, when the lens is moved from the first lens position $m_1$ to the second lens position $m_2$, if the focus value at the second lens position $m_2$ is less than the focus value at the first lens position $m_1$, the third lens position $m_3$ is selected such that the focus value at this position is greater than the focus values at the first position $m_1$. That is, the first lens position $m_1$ is located between the second lens position $m_2$ and the third lens position $m_3$. On the other hand, if the focus value at the second lens position $m_2$ is greater than the focus value at the first lens position $m_1$, the third lens position $m_3$ is selected such that the focus value at the position is greater than the focus value at the second lens position $m_2$. That is, the second lens position $m_2$ is located between the first lens position $m_1$ and the third lens position $m_3$. Then, the process goes to step S302.

At step S302, fit the function $Z(F)=Ax^2+Bx+C$ to a plurality of focus samples in the initial dataset, to obtain parameters $A_i$, $B_i$, $C_i$, the fitting preferably being a weighted fitting wherein the weight values of the weight fitting are independently proportional to each of the focus values corresponding to a plurality of the lens positions in the initial dataset. Further, obtain an estimated lens position $m_i$ according to the estimated parameters $A_i$, $B_i$, and $C_i$. Then, the process goes to step S303.

At step S303, move the lens to the estimated lens position $m_i$, and then, at step S304, obtain the focus value $f_i$ corresponding to the estimated lens position $m_i$. Then, the process goes to step S305.

At step S305, determine whether the estimated lens position $m_i$ is proximate to the prior estimated lens position thereof $m_{i-1}$; that is, it is determined whether $|m_i-m_{i-1}|$ is less than or equal to a predetermined value M. If it is not, the process goes to step S306, and, if it is, the autofocus process is terminated.

At step S306, add the estimated lens position $m_i$ and the corresponding focus value $f_i$ into the initial dataset to produce a new dataset, and fit the function $Z(F)=Ax^2+Bx+C$ to a plurality of the lens positions $m_1, m_2, m_3, \ldots, m_{i-1}, m_i$ contained in the new dataset and a plurality of the focus values $f_1, f_2, f_3, \ldots, f_{i-1}, f_i$ individually corresponding to a plurality of the lens positions $m_1, m_2, m_3, \ldots, m_{i-1}, m_i$ and then the value i is increased by one, to re-estimate the estimated lens position $m_i$. Then, the process goes back to step S303.

Since the autofocus method performs focusing a model involving the lens position and the focus value, the ideal lens position may be obtained after only three lens movements.

Therefore, the method works by fitting the function $Z(F)=Ax^2+Bx+C$ to the focus samples in the dataset obtained through the previous steps until the ideal lens position is obtained. In theory, the value $|m_i-m_{i-1}|$ should be equal to zero; however, a sufficiently small value of $|m_i-m_{i-1}|$ is acceptable in practice.

Figure 4:
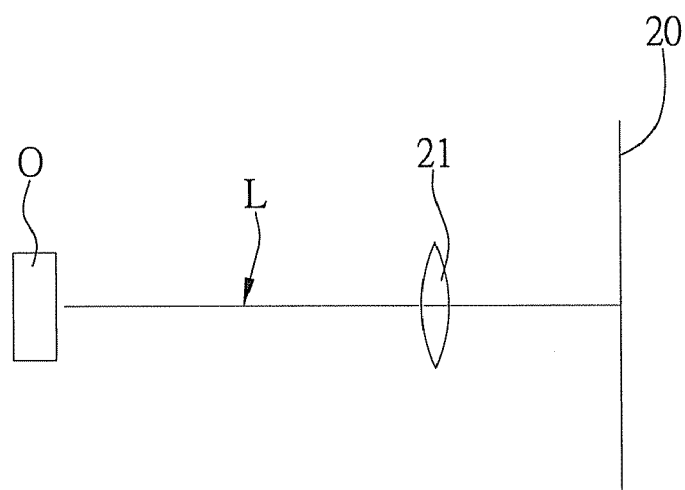
FIG. 4 is a diagram showing the axis of a lens perpendicular to the lens.

As shown in FIG. 4, the axis of the lens is perpendicular to the lens. In the case, the sensor plane 20 of the camera is not moved, and there are about 1100 lens positions along the axis L. The predetermined value M can be five. In other embodiments, the predetermined value M can be determined according to the number of lens positions, the application area or the required accuracy. Preferably, the predetermined value M is zero, i.e., the estimated lens position is the ideal lens position (meaning that the clearest image can be captured at this position).

Since there are three parameters A, B and C in the function $Z(F)=Ax^2+Bx+C$, the function can be fitted to three focus samples so as to estimate the parameters A, B and C. On the other hand, the full model $F=G(a,b,c,(x-m))$ has four parameters a, b, c and m, and, accordingly, the parameters a, b, c and m can be obtained by fitting the full model F to four focus samples.

According to the above-described steps, each time the lens is moved to an estimated lens position, the focus value is calculated and the function $Z(F)=Ax^2+Bx+C$ can further be fitted to the focus samples in the dataset, for estimating the subsequent lens position. Such a process is repeated until the estimated lens position is proximate to the current lens position, i.e., the difference between the estimated lens position and the current lens position is less than or equal to the predetermined value M.

Therefore, the autofocus method of the present invention does not need to move the lens to all lens positions to calculate the corresponding focus values. Instead, the present method only needs to fit the function to the focus samples in the dataset so as to estimate parameters of the function and the subsequent lens position.

Figure 5:
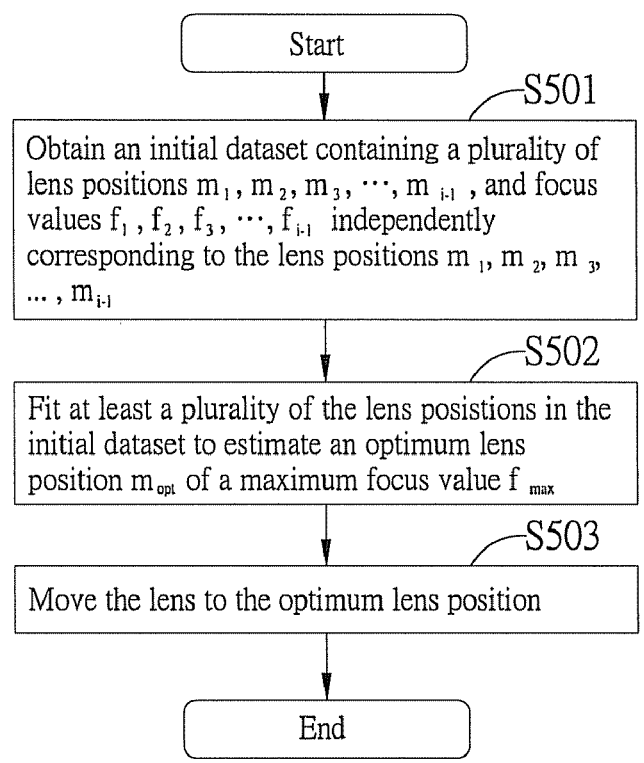
FIG. 5 is a flowchart showing an autofocus method according to an embodiment of the present invention.

FIG. 5 is a flowchart showing an autofocus method according to another embodiment of the present invention. As shown in FIG. 5, at step S501, an initial dataset of focus samples is obtained by moving the lens to different lens positions, wherein the initial dataset of focus samples contains a plurality of lens positions, $m_1, m_2, m_3, \ldots, m_{i-1}$ and focus values $f_1, f_2, f_3, \ldots, f_{i-1}$ independently corresponding to the lens positions $m_1, m_2, m_3, \ldots, m_{i-1}$. As a specific embodiment, the lens is moved to three different positions $m_1$, $m_2$, and $m_3$ so as to obtain the focus values $f_1$, $f_2$, and $f_3$ corresponding to the lens positions, respectively. The three different positions $m_1$, $m_2$, and $m_3$ and the corresponding focus values $f_1$, $f_2$, and $f_3$ are denoted as the initial dataset of focus samples. At step S502, fit a function $Z(F)=Ax^2+Bx+C$ to the focus samples in the initial dataset, to estimate an optimum lens position $m_{opt}$ with maximum focus value $f_{max}$. Preferably, the fitting is a weighted fitting in which weight values of the weight fitting are individually proportional to each of the focus values corresponding to the lens positions in the initial dataset. At step S503, move the lens to the optimum lens position $m_{opt}$. Then, the process of the autofocus method is terminated.

Figure 6:
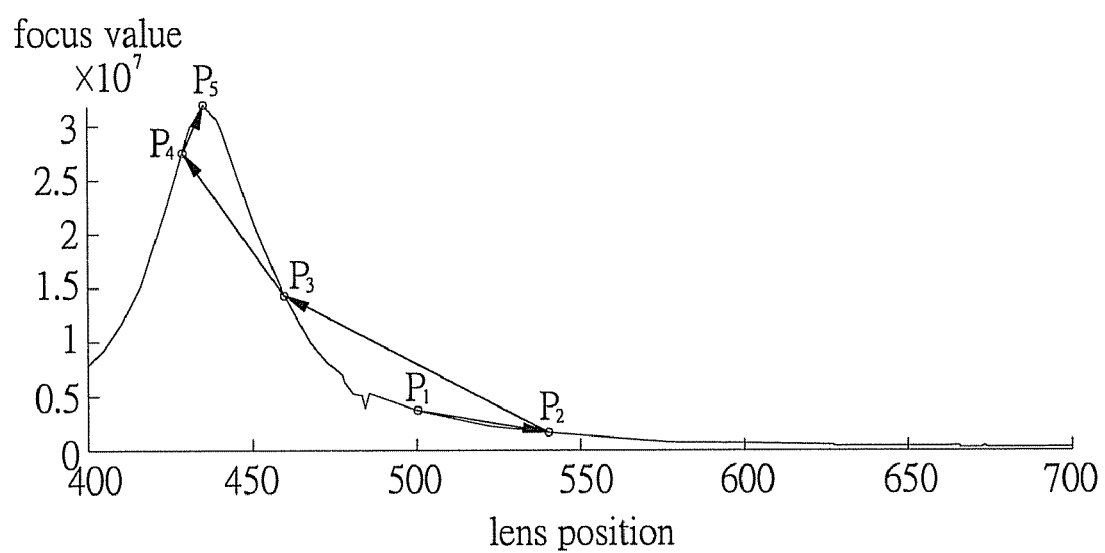
FIG. 6 is a diagram showing an autofocus process with the position of the lens gradually approaching the position with the maximum focus value.

FIG. 6 shows an autofocus process with the lens position gradually approaching the ideal lens position according to the embodiments shown in FIG. 3.

As shown in FIG. 6, first, a lens position $P_1$ is arbitrarily chosen and the focus value corresponding to the lens position $P_1$ is calculated. Next, another lens position $P_2$ is arbitrarily chosen and the corresponding focus value is calculated. Then, the focus values at these two lens positions $P_1$, $P_2$ are compared such that a estimated lens position $P_3$ is chosen with its focus value greater than the focus values at the lens positions $P_1$, $P_2$.

Then, fit the function $Z(F)=Ax^2+Bx+C$ to focus samples in the dataset comprising the three lens positions $P_1$, $P_2$, and $P_3$ and the corresponding focus values, so as to estimate the subsequent lens position $P_4$. Subsequently, move the lens to the position $P_4$ and the corresponding focus value is calculated. Thus, in total, there are four focus samples in the dataset comprising the four lens positions $P_1$, $P_2$, $P_3$ and $P_4$ and the corresponding focus values. Fit the function $Z(F)=Ax^2+Bx+C$ to the four focus samples so as to estimate another lens position $P_5$ in FIG. 6. Then, move the lens to the position $P_5$ and calculate the corresponding focus value.

Subsequently, determine whether the position $P_5$ is proximate to $P_4$, i.e., whether the difference between the lens position $P_4$ and the lens position $P_5$ is less than or equal to the predetermined value M. For example, if the difference between the lens position $P_5$ and the lens position $P_4$ is within 5 lens positions, it means that the lens position is proximate to the ideal lens position. Then, terminate the autofocus process. On the other hand, if the difference between the lens position $P_s$ and the lens position $P_4$ is greater than 5 lens positions, fit the function $Z(F)=Ax^2+Bx+C$ to the five focus samples obtained through the above-described steps so as to estimate another lens position and calculate the focus value corresponding to the lens position (such as $P_6$, not shown).

The fitting steps are repeated until the difference between the estimated lens position and the current lens position is less than or equal to the predetermined value, that is, the estimated lens position approximates the ideal lens position.

Therefore, according to the present invention, the ideal lens position can be estimated by fitting the function $Z(F)=Ax^2+Bx+C$ to an initial dataset of focus samples containing lens positions and corresponding focus values, and determining whether the estimated lens position is proximate to the prior-estimated lens position, wherein, if it is not, fit a plurality of the lens positions obtained in previous steps and the focus values individually corresponding to a plurality of the lens positions, the fitting process being repeated for estimating the subsequent lens position; and, if it is proximate, the autofocus process is terminated. Compared with the prior art, the present invention increases the focusing speed and reduces the number of lens movements. In addition, the parameters of the present invention control the amplitude and curvature of the curve formed by the lens positions and the focus values, such that the ideal lens position can be estimated through these parameters.

Therefore, the autofocus method of the present invention accumulates the focus samples obtained each time the lens is moved to a lens position so as to rectify the estimated lens position, thereby making the lens position proximate to the ideal lens position. As a result, the autofocus process can be rapidly and accurately completed.

The above-described descriptions of the detailed embodiments are provided to illustrate the preferred implementation according to the present invention, and are not intended to limit the scope of the present invention. Accordingly, many modifications and variations completed by those with ordinary skill in the art will fall within the scope of present invention as defined by the appended claims.

What is claimed is:
1. An autofocus method, comprising the steps of:
   (1) obtaining an initial dataset of focus samples containing lens positions and focus values corresponding to the lens positions;
   (2) fitting the focus samples in the initial dataset to obtain an estimated lens position;
   (3) moving the lens to the estimated lens position to obtain an estimated focus value corresponding to the estimated lens position; and
   (4) determining whether the estimated lens position is proximate to the prior estimated lens position thereof, wherein, if it is, the autofocus process stops, and, if it is not, fitting a plurality of focus samples obtained in previous steps to re-estimate a subsequent lens position, and then returning to the step (3).

2. The autofocus method of claim 1, wherein the focus samples used for the fitting of step (2) and step (4) are the focus values obtained from the reciprocal transformation, $Z(F)=1/F$, wherein F corresponds to the focus values.

3. The autofocus method of claim 1, wherein the fitting of step (2) and step (4) is a weighted fitting.

4. The autofocus method of claim 3, wherein weight values of the weighted fitting in step (2) are independently proportional to each of the focus values corresponding to the lens positions in the initial dataset, and weight values of the weighted fitting in step (4) are independently proportional to each of the focus values corresponding to the lens positions obtained in previous steps and the estimated lens position.

5. The autofocus method of claim 1, wherein the initial dataset in step (1) contains at least three different lens positions in sequential order and at least three focus values corresponding to the lens positions.

6. The autofocus method of claim 5, wherein the three different lens positions include a first lens position, a second lens position and a third lens position, and wherein the focus value corresponding to the third lens position is greater than focus values individually corresponding to the first and second lens positions.

7. The autofocus method of claim 5, wherein the three different lens positions include a first lens position, a second lens position and a third lens position, and when the focus value corresponding to the second lens position is greater than the focus value corresponding to the first lens position, the second lens position is located between the third lens position and the first lens position.

8. The autofocus method of claim 5, wherein the three different lens positions include a first lens position, a second lens position and a third lens position, and when the focus value corresponding to the second lens position is smaller than the focus value corresponding to the first lens position, the first lens position is located between the third lens position and the second lens position.

9. The autofocus method of claim 1, wherein the estimated lens position being proximate to the prior estimated lens position thereof means that the difference between the estimated lens position and the prior estimated lens position is less than or equal to a predetermined value.

10. The autofocus method of claim 9, wherein the predetermined value is zero.

11. An autofocus method, comprising the steps of:
(1) obtaining an initial dataset of focus samples containing lens positions and focus values corresponding to the lens positions;
(2) fitting the focus samples in the initial dataset to estimate an optimum lens position with a maximum focus value; and
(3) moving the lens to the optimum lens position.

12. The autofocus method of claim 11, wherein the fitting of step (2) is performed by reciprocal transformation, $Z(F)=1/F$, wherein F is focus sample.

13. The autofocus method of claim 11, wherein the initial dataset in step (1) contains at least three different lens positions in sequential order and at least three focus values corresponding to the lens positions.

14. The autofocus method of claim 13, wherein the three different lens positions include a first lens position, a second lens position and a third lens position, and wherein the focus value corresponding to the third lens position is greater than focus values individually corresponding to the first and second lens positions.

15. The autofocus method of claim 13, wherein the three different lens positions include a first lens position, a second lens position and a third lens position, in which, when the focus value corresponding to the second lens position is greater than the focus value corresponding to the first lens position, the second lens position is located between the third lens position and the first lens position.

16. The autofocus method of claim 13, wherein the three different lens positions include a first lens position, a second lens position and a third lens position, in which, when the focus value corresponding to the second lens position is smaller than the focus value corresponding to the first lens position, the first lens position is located between the third lens position and the second lens position.

17. The autofocus method of claim 11, wherein the fitting of step (2) is a weighted fitting.

18. The autofocus method of claim 17, wherein weight values of the weighted fitting in step (2) are independently proportional to each of focus values corresponding to a plurality of the lens positions in the initial dataset.

* * * * *